3,431,079
ALKYLATION
Charles C. Chapman, Bartlesville, Okla., assignor to Phillips Petroleum Company, a corporation of Delaware
Filed Jan. 24, 1966, Ser. No. 522,727
U.S. Cl. 23—260      2 Claims
Int. Cl. B01j *1/00;* C07c *3/54*

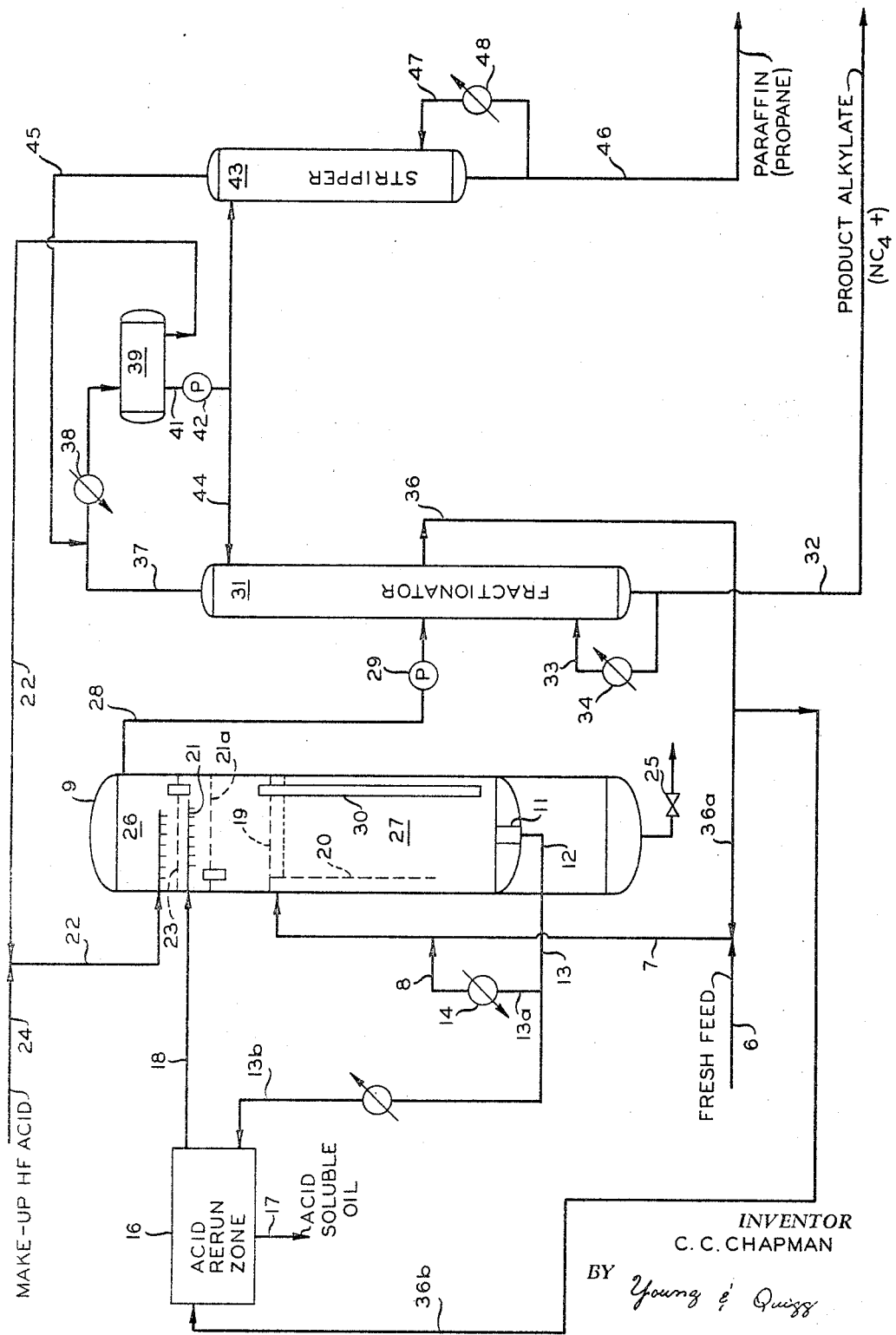

This invention relates to the catalytic alkylation of hydrocarbons. In one aspect it relates to increasing the yield of product alkylate by avoiding recycle of alkylate in acid recycle. In another aspect it relates to an improved alkylation system for obtaining increased yield of product alkylate.

It is an object of this invention to increase the yield of alkylate produced in the HF catalyzed alkylation by an isoparaffin of an olefin.

It is another object of this invention to provide apparatus capable of increasing the yield of alkylate produced therein.

Other aspects, objects, and the several advantages of the invention will become apparent from a study of the disclosure, the drawing, and the appended claims to the invention.

According to this invention, I have now discovered that considerable increase in the yield which is normally obtained in an HF alkylation process can be obtained if the emulsion resulting from the HF alkylation zone is separated in a manner which will preclude the recycling to the alkylation zone materials such as alkylate product and inert hydrocarbons which have been previously treated therein.

The process of this invention can be carried out in a system which comprises means for alkylating by isoparaffin of an olefin, in the presence of an HF catalyst; a vessel means communicating with the alkylation means, said vessel means further comprising a preferably vertically elongated cylindrical shell adapted for pressure operation; a first contacting zone, for example a tray or trays, disposed transverse of said vessel and located below a first opening in said shell; a second contacting zone similarly disposed and located below said first tray and below a second opening; first conduit means for introducing catalyst low in acid soluble oils at said first opening on said vessel means, adjacent the separated hydrocarbon phase; a second conduit means for withdrawing a stream from said hydrocarbon phase; a fractionation zone communicating with the downstream end of said second conduit means; third conduit means for recovering product alkylate from the kettle portion of said fractionation zone; fourth conduit means for withdrawing a stream from the separated acid phase; an acid rerun zone communicating with the downstream end of said fourth conduit means; and fifth conduit means for passing rerun acid from said rerun zone to said second opening on said vessel means, adjacent the separated hydrocarbon phase.

Adjacent the emulsion introduction means in said first contactor there is provided a vertical baffle which has a lower end terminating above the lower end of the lowermost acid downcomer to minimize reemulsification or reentrainment of hydrocarbon and catalyst and the resulting carryover of hydrocarbon product in the reaction zone which, in turn, causes a backing up of fresh feed and/or recycle, with the result that less product can be produced per unit of time.

The alkylation reaction is carried out with the hydrocarbon reactants in the liquid phase; however, the reactants needs not be normally liquid hydrocarbons. The reaction conditions can very in temperature from sub-zero temperatures to temperatures as high as a few hundred degrees Fahrenheit, and can be carried out at pressures varying from atmospheric to as high as 1,000 p.s.i., and higher. A variety of alkylation catalysts can be employed in the alkylation reaction, including well-known catalysts, such as sulfuric acid, hydrofluoric acid, phosphoric acid; metal halides, such as aluminum chloride, aluminum bromide, etc., and other liquid alkylation catalysts. While generally applicable to the alkylation of hydrocarbons, the present invention is particularly effective for the alkylation of low boiling olefins like ethylene, propylene, butenes, isobutylene, pentenes, etc., with saturated branched chain paraffins, such as isobutane, in the presence of hydrofluoric acid. In the alkylation of isoparaffins and olefins, a substantial molar excess of isoparaffin to olefin is employed, usually to provide a feed ratio in excess of 1:1, usually from about 4:1 to about 20:1 and preferably about 6:1 to 15:1. The reaction zone is maintained under sufficient pressure to ensure that the hydrocarbon reactants and alkylation catalysts are in the liquid phase. The temperature of the reaction will vary with the reactants and with the catalysts employed, but generally ranges from between about —40° F. to about 150° F.

Referring now to the drawing, there is now described a specific example of an operation, according to the present invention. An alkylatable hydrocarbon, such as propylene or butylene, and an alkylating compound, such as isobutane, admixed in suitable proportions passes as fresh feed via conduit 6 to reaction conduit 7. HF catalyst enters conduit 7 via conduit 8. As the acid catalyst and hydrocarbon reactants come in contact, reaction between the olefin and isoparaffin occurs, with the formation of higher molecular weight materials of high octane value. The reaction being exothermic, the temperature of the acid and reactants increases as the reaction mixture moves upwardly through conduit 7. Within a very short period of time, usually on the order of 0.1 to 30 seconds, the alkylation reaction is completed, after which reaction effluent containing hydrocarbon product (alkylate), acid catalyst, and unreacted feed hydrocarbons passes from conduit 7 into the upper portion of phase separation vessel 9. A vertically elongated cylindrical shell, suitable for pressure operation up to 150 p.s.i.a., is preferred. This vessel is suitably 6½' in diameter and about 55' in height. A vortex breaker 11 is disposed in the lower portion of vessel 9, and a conduit 12 communicates therefrom with an opening in the side of the vessel.

The reacted feed hydrocarbons and acid enter vessel 9 at approximately the acid level. Baffle 20 positioned in vessel 9 directs the inlet hydrocarbons-acid admixture into the acid phase and serves to reduce the turbulence created by the incoming feed and maintain a quiescence zone for obtaining the hydrocarbon-acid phase separation. The low acid-soluble oil content acid introduced through conduits 18 and 22 into the hydrocarbon phase above tray 19 passes through downcomer 30 from tray 19 into the acid phase. It is preferred that downcomer 30 extend below the lower end of baffle 20 to minimize the reemulsification of the acid with the inlet hydrocarbons from conduit 7. The flow of the acid from downcomer 30, if permitted to contact the inlet hydrocarbons, will cause a carry out of emulsion and/or hydrocarbons with the acid catalyst and result in the undesired recycle thereof. The length of the extension of downcomer 30 below baffle 20 will vary depending upon the inlet hydrocarbon flow rate, the downcoming acid flow rate and size of vessel 9. However, for most conventional size equipment and operating conditions, a termination for downcomer 30 of about 1½ feet below that of baffle 20 will suffice to prevent undue turbulence and recycle of the hydrocarbons with the acid. The recycle of hydrocarbons will back out fresh hydrocarbon with the acid catalyst to the reactor which results in a reduction in the quantity of alkylate being produced.

External conduit 13 splits, passing a stream of acid phase via conduit 13a, through cooler 14, to HF feed conduit 8. Acid phase stream 13b passes to an acid rerun zone 16, suitably a stripping tower, wherein soluble oils are separted therefrom, and withdrawn from the system via conduit 17. Rerun acid passes back via conduit 18 into the upper portion of vessel 9 adjacent the hydrocarbon phase, wherein it is sparged downwardly onto a rigid, transversely disposed contacting tray 21a, via nozzles 21. Concurrently, HF acid is introduced via conduit 22 into vessel 9 onto a second and higher contacting tray 23. Fresh makeup HF acid is introduced into conduit 22, as required, from conduit 24. The materials introduced into vessel 9 segregate into an upper hydrocarbon phase 26 and a lower acid phase 27. The lowest portion of vessel 9, below acid outlet conduit 12, may serve as an acid storage chamber, or other process vessel, with at least one valved opening 25.

A portion of hydrocarbon phase 26, with a significantly reduced organic fluoride and/or acid soluble oils content, is drawn through conduit 28, having pump 29 disposed therein, to the feed tray of a fractionator 31. Product alkylate, and some upseparated n-butane, is drawn from the kettle portion of tower 31, via conduit 32. A side stream 33 is drawn off conduit 32, heated in exchanger 34, to reboil the kettle of fractionator 31. A side stream 36 is drawn from tower 31 comprising unreacted isobutane which is recycled in part via conduit 36a to reaction conduit 7, and in part to acid rerun zone 16, by conduit 36b.

Overhead vapors from fractionator 31, comprising light paraffin hydrocarbons, particularly propane and HF, pass via conduit 37, cooler 38, accumulator 39, conduit 41, having pump 42 therein, to an acid stripper 43. Side conduit 44 recycles a portion of the condensed overhead to reflux fractionator 31. Condensed separated HF passes from accumulator 39 into conduit 22, and is fed to phase separator 9. The overhead from acid stripper 43, comprising a mixture of light hydrocarbon and HF, passes via conduit 45 back to fractionator overhead conduit 37. Substantially pure light hydrocarbon is withdrawn from the kettle portion of stripper 43 via conduit 46. A side stream 47, having heater 48 disposed therein, reboils the stripper.

The following material balances, as Tables I and II are presented in illustration of an application of the alkylation on a commercial scale. Table II illustrates the alkylaprocess wherein baffles 20 and downcomer 30 are as described in accordance with the present invention.

TABLE I

[Barrels per day]

| Component | Stream | | | | | | | | | | | |
|---|---|---|---|---|---|---|---|---|---|---|---|---|
| | 6 | 13a | 36a | 13 | 13b | 17 | 18 | 28 | 32 | 36b | 22* | 46 |
| Propane | 100.0 | 210.0 | 220.0 | 210.4 | 0.4 | | 11.4 | 354.0 | | 11.0 | 3.0 | 120.0 |
| Isobutane | 600.0 | 1,520.0 | 3,880.0 | 1,523.0 | 3.0 | Tr | 197.0 | 4,080.0 | 5.0 | 194.0 | | 1.0 |
| Normal Butane | 60.0 | 110.0 | 230.0 | 110.2 | 0.2 | | 11.7 | 301.5 | 60.0 | 11.5 | | |
| Alkylate | | 180.0 | 60.0 | 180.4 | 0.4 | | 3.4 | 1,083.0 | 1,020.0 | 3.0 | | |
| Propylene | 300.0 | | | | | | | | | | | |
| Butylenes | 300.0 | | | | | | | | | | | |
| Water | | 590.0 | | 591.8 | 1.8 | Tr | 1.8 | | | | | |
| Acid Sol. Oils | | 1,450.0 | | 1,454.9 | 4.9 | 0.9 | 4.0 | | | | | |
| HF | | 35,000.0 | Tr | 35,090.0 | 90.0 | | 90.0 | 30.0 | | 30.0 | | |
| Total | 1,360.0 | 39,060.0 | 4,390.0 | 39,160.7 | 100.7 | 0.9 | 319.3 | 5,848.5 | 1,085.0 | 219.5 | 33.0 | 121.0 |

$$\frac{i-C^4/}{Olefin} = \frac{6,000/}{600} = 10:1.$$

$$\frac{HF/}{HC} = \frac{35,000/}{7,770} = 4.5:1.$$

Total to Reactor=44,810.0.
Tr=Trace.
*Not including makeup HF.

TABLE II

[Barrels per day]

| Component | Stream | | | | | | | | | | | |
|---|---|---|---|---|---|---|---|---|---|---|---|---|
| | 6 | 13a | 36a | 13 | 13b | 17 | 18 | 28 | 32 | 36b | 22* | 46 |
| Propane | 102.0 | 163.0 | 242.0 | 163.2 | 0.2 | | 12.2 | 379.0 | | 11.0 | 3.0 | 122.0 |
| Isobutane | 612.0 | 1,238.0 | 4,269.8 | 1,240.5 | 2.5 | Tr | 216.1 | 4,489.4 | 5.0 | 213.6 | | 1.0 |
| Normal Butane | 61.2 | 60.0 | 253.0 | 60.1 | 0.1 | | 12.7 | 326.8 | 61.2 | 12.6 | | |
| Alkylate | | 91.0 | 66.0 | 91.2 | 0.2 | | 3.5 | 1,109.7 | 1,040.4 | 3.3 | | |
| Propylene | 306.0 | | | | | | | | | | | |
| Butylenes | 306.0 | | | | | | | | | | | |
| Water | | 590.0 | | 591.8 | 1.8 | Tr | 1.8 | | | | | |
| Acid Sol. Oils | | 1,450.0 | | 1,454.9 | 4.9 | 0.9 | 4.0 | | | | | |
| HF | | 35,000.0 | | 35,090.0 | 90.0 | | 90.0 | 30.0 | | 30.0 | | |
| Total | 1,387.2 | 38,592.0 | 4,830.8 | 38,691.7 | 99.7 | 0.9 | 340.3 | 6,334.9 | 1,106.6 | 241.5 | 33.0 | 123.0 | i-C₄/Olefin=6,119.8/612=10:1.
HF/HC=35,000/7,700=4.5:1.
Total to Reactor 44,810.0.
Tr=Trace.
*Not including makeup HF.

Table I and Table II use the same pressure, temperature, reactor charge rates (44,810 b./d.), isobutane to olefin volume ratio (10:1), and HF catalyst to hydrocarbon volume ratio (4.5:1).

The data clearly demonstrate the advantages of the present invention.

The conventional process produces 1,085.0 barrels per day of alkylate, whereas the process of the invention produces 1,106.6 barrels per day, or a net gain 21.6 barrels per day, amounting to a gain of about $30,000 per year.

Enumeration of preferred temperatures and pressures for certain of the process components are set forth in Tables III and IV, respectively.

TABLE III

| Phase separator 9: | Temperatures ° F. |
|---|---|
| Section 26 | — |
| Section 27 | — |
| Feed 37 | 82 |
| Cooler 14 outlet | 80 |
| Rerun zone 16 (top) | 275 |
| (bottom) | 300 |
| Fractionator 31 (top) | 113 |
| (bottom) | 402 |
| Acid stripper 43 (top) | 110 |
| (bottom) | 130 |
| Heater 15: | |
| In | 105 |
| Out | 300 |

TABLE IV

| | Pressures, p.s.i.a. |
|---|---|
| Separator 9 | 125 |
| Rerun column 16 | 150 |
| Fractionator 31 | 250 |
| Stripper 43 | 280 |

Having thus illustrated our invention by providing a specific example thereof, it is to be understood that no undue limitations or restrictions are to be drawn therefrom.

Reasonable variations and modifications are possible within the scope of the foregoing disclosure, drawing, and appended claims.

I claim:

1. Alkylation apparatus comprising: means for alkylation of an alkylatable hydrocarbon with an alkylating compound in the presence of HF acid; vessel means communicating with said alkylation means for permitting separation of the resulting reaction effluent into an upper hydrocarbon phase and a lower acid phase; vertical baffle means positioned in said vessel adjacent the point of introduction of said effluent thereto and extending downwardly in said lower acid phase; a plurality of contacting means positioned within said vessel in said hydrocarbon phase, a plurality of downcomers associated with each of said contacting means and wherein the lowermost of said downcomers is remotely positioned from said baffle means and has the lower outlet thereof below the lower edge of said baffle means; first conduit means for introducing HF acid at a first opening on said vessel means adjacent the separated hydrocarbon phase; second conduit means for withdrawing a stream from said hydrocarbon phase; a fractionation zone communicating with the downstream end of said second conduit means; third conduit means for recovering product alkylate from the bottom portion of said fractionation zone; fourth conduit means for withdrawing a stream from said acid phase, an acid rerun zone communicating with the downstream end of said fourth conduit means; fifth conduit means for passing rerun acid from said rerun zone to a second opening on said vessel adjacent the separated hydrocarbon phase and below said first opening.

2. The apparatus of claim 1 wherein said vertical baffle is perforated.

References Cited

UNITED STATES PATENTS

| 2,520,391 | 8/1950 | Findlay | 260—683.48 XR |
| 2,906,610 | 9/1959 | Clinkenbeard et al. | 23—260 XR |
| 3,179,712 | 4/1965 | Carson | 260—683.48 |
| 3,212,860 | 10/1965 | Vernon | 260—683.48 XR |
| 3,213,157 | 10/1965 | Hays et al. | 260—683.48 |
| 3,249,649 | 5/1966 | Sherk et al. | 260—683.48 |

MORRIS O. WOLK, *Primary Examiner.*

R. E. SERWIN, *Assistant Examiner.*

U.S. Cl. X.R.

23—283, 285; 260—683.48, 683.58